Figure 1:
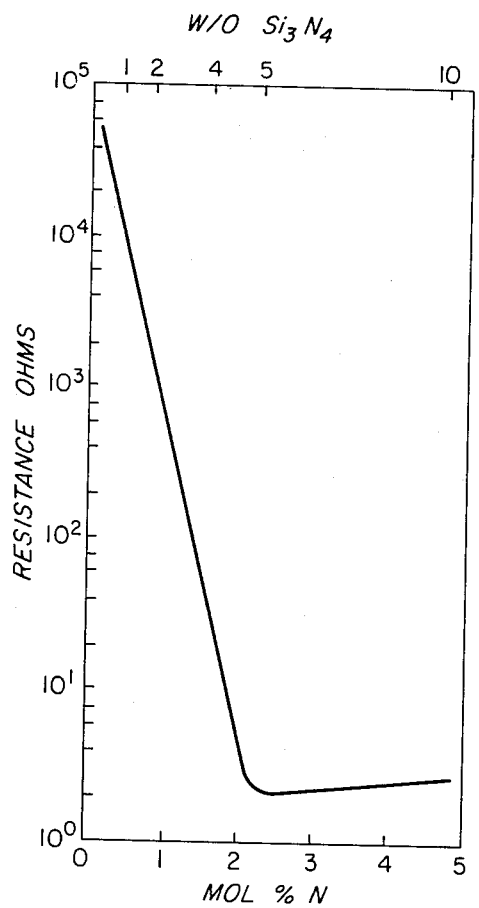

United States Patent [19]
Prochazka

[11] 3,968,194
[45] July 6, 1976

[54] DENSE POLYCRYSTALLINE SILICON CARBIDE

[75] Inventor: Svante Prochazka, Ballston Lake, N.Y.

[73] Assignee: General Electric Company, Schenectady, N.Y.

[22] Filed: Oct. 6, 1975

[21] Appl. No.: 619,953

Related U.S. Application Data

[62] Division of Ser. No. 431,611, Jan. 8, 1974.

[52] U.S. Cl. .................................. 264/65; 106/44; 106/55
[51] Int. Cl.² ................. C04B 35/56; C04B 35/52; C04B 35/14
[58] Field of Search .................... 106/44; 264/65

[56] References Cited
UNITED STATES PATENTS 3,468,992  9/1969  Lubatti et al. ...................... 106/44
3,853,566  12/1974  Prochazka ........................... 106/44
3,892,523  7/1975  Winter et al. ........................ 106/44

Primary Examiner—Winston A. Douglas
Assistant Examiner—Mark Bell
Attorney, Agent, or Firm—Jane M. Binkowski; Joseph T. Cohen; Jerome C. Squillaro

[57] ABSTRACT

A dense silicon carbide material having improved electrically conducting properties is disclosed which is prepared by forming a homogeneous dispersion of silicon carbide, a sufficient amount of a boron containing additive, and 3.5–10.0% by weight of silicon nitride and hot pressing the dispersion at a sufficient temperature and pressure whereby a dense substantially non-porous ceramic is formed. The silicon carbide material can be machined by electrical discharge machining or by electrochemical machining.

5 Claims, 2 Drawing Figures

DENSE POLYCRYSTALLINE SILICON CARBIDE

This is a division of application Ser. No. 431,611, filed Jan. 8, 1974.

The invention herein described was made in the course of or under a contract or subcontract thereunder (or grant) with the Department of the Navy.

The chemical and physical properties of silicon carbide make it an excellent material for high temperature structural applications. These properties include good oxidation resistance and corrosion behavior, good heat transfer coefficients, low thermal expansion coefficient, high thermal shock resistance and high strength at elevated temperature. This unique combination of properties suggests the use of silicon carbide as components for gas turbines, check valves for handling corrosive liquids, linings of ball mills, heat exchangers and refractories for high temperature furnaces, pumps for die casting machines and combustion tubes.

Heretofore, hot pressing of silicon carbide was used to produce small specimens under closely controlled conditions. Unfortunately, silicon carbide is not easily sintered to densities approaching the theoretical density of 3.21 grams per cubic centimeter. A method of hot pressing silicon carbide to uniform densities on the order of 98% of the theoretical density with slight additions of aluminum and iron aiding in densification is disclosed by Alliegro et al., J. Ceram. Soc., Vol. 39, II (November 1956), pages 386–389.

My copending application entitled HOT PRESSED SILICON CARBIDE, Ser. No. 317,426, filed Dec. 21, 1972, described an improved method of making a dense silicon carbide ceramic by forming a homogeneous dispersion of a submicron powder of silicon carbide and a boron containing additive and hot pressing the dispersion at a temperature of about 1900°–2000°C. and at a pressure of about 5,000–10,000 psi for a sufficient time to produce a dense nonporous silicon carbide ceramic. The advantage of boron as a sintering aid, in comparison to other materials such as alumina, aluminum nitride and other metallic compounds, is that boron provides increased oxidation and corrosion resistance at elevated temperature.

Subsequently, Prochazka et al, in the copending application Ser. No. 378,918 filed July 13, 1973, disclosed a further improvement in hot pressing silicon carbide by incorporating a carbonaceous additive into the homogeneous dispersion of silicon carbide and boron containing additive powders. The addition of the carbon suppresses exaggerated grain growth in the microstructure of the dense silicon carbide ceramic product and yields improved strength properties. However, hot pressing yields excellent ceramic materials only in the form of billets having a simple geometric shape. The manufacture of more complex shapes is very difficult by conventional means because of the extreme hardness of silicon carbide which is somewhere between corundum and diamonds.

Two special machining techniques used for removal of metal are electrochemical machining (ECM) and electrical discharge machining (EDM). Electrochemical machining involves a chemical process which removes metal by breaking the molecular bonds and removes the metal, molecule by molecule, but at a very fast rate using a smooth DC current with the workpiece usually positive. On the other hand, electrical discharge machining is concerned essentially with an intermittent process using pulses of DC current. The workpiece may be either positive or negative, but is usually negative. Erosion occurs as a result of the energy liberated during an electrical discharge between an electrode and the workpiece which causes intense heating of the zone of impact of the discharge. The effect of this is to vaporize a certain volume of metal from the workpiece to be machined.

While these methods are relatively proven techniques for metals, they have not been extensively used as material removal processes for ceramics. A consideration which make them attractive for the shaping of ceramics is that these processes are not dependent on the hardness of the workpiece. A limitation, however, is that ECM and EDM are restricted to materials with reasonably good electrical conductivity. Germanium crystals having a resistance of 31 ohm cm have been cut using the EDM technique with low spark energies of $10^{-3}$ to $10^{-4}$ joule and resistivities much greater than this would, probably, substantially limit the cutting process. This requirement eliminates most of the conventional ceramic and vitreous materials and limits the application to conductive intermetallic compounds. Thus, heretofore the EDM technique has not been practical for shaping silicon carbide.

In accordance with the present invention, I have discovered a high temperature, high strength silicon carbide ceramic material capable of being machined by electrical discharge machining technique. My invention includes a method of making an electrically conducting silicon carbide ceramic by forming a substantially homogeneous dispersion of a submicron powder of silicon carbide, a boron containing compound selected from the group consisting of boron and boron carbide, wherein the amount of the boron containing compound is equivalent to 0.3 – 3.0% by weight of boron and 3.5 – 10.0% by weight of silicon nitride, and thereafter hot pressing the dispersion in an inert atmosphere at a temperature of about 1950°–2050°C and at a pressure of about 5,000 – 10,000 psi for a sufficient time to produce a high density ceramic. The silicon carbide ceramic product has a maximum resistivity of about 50 ohm cm. The product obtained has a density of at least 98% of the theoretical density. It is suitable as an engineering material such as, for example, in high temperature gas turbine applications.

Figure 2:
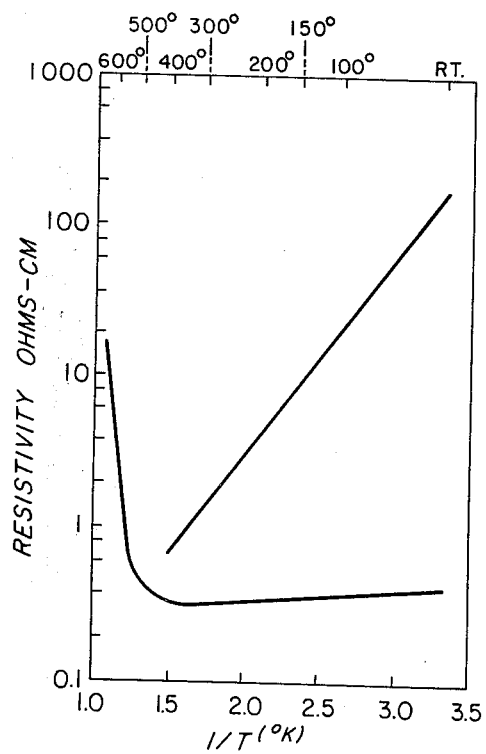

The invention is more clearly understood from the following description taken in conjunction with the accompanying drawing in which:

FIG. 1 is a graphic representation depicting the resistance as a function of the percent addition of silicon nitride of hot pressed silicon carbide prepared according to the present invention and FIG. 2 is a graphic representation of the resistivity as a function of the inverse temperature for pressure sintered silicon carbide containing boron with and without addition of silicon nitride.

It is essential that the powder dispersion is a mixture of submicron particle sized powders in order to obtain the high densities and strengths upon hot pressing. These may be obtained by different techniques as, for example, by direct synthesis from the elements, by reduction of silica, or by pyrolysis of compounds containing silicon and carbon. The pyrolytic technique is particularly advantageous in that it yields a powder having a controlled particle size, a predetermined composition and is composed mainly of isolated crystallites.

In this process methyltrichlorosilane vapor and hydrogen or a mixture of $SiCl_4$ vapor and a suitable hydrocarbon vapor, such as toluene, and hydrogen are introduced into an argon plasma generated between two concentric electrodes. In the hot plasma the compounds decompose into ions and the most stable molecules, i.e., SiC and HCl, form on cooling the gases. The SiC is formed by small crystals typically 0.1–0.3 $\mu$ in size. The advantage of this product is that the crystallites are not aggregated and that the carbon to silicon ratio can be controlled by monitoring the initial vapor composition so that the SiC powders slightly enriched in carbon can be obtained. Moreover, $BCl_3$ can be further added to the reactants in the desired amounts whereby the SiC powders are doped with boron which has been dispersed essentially on a molecular level.

Another process for preparing silicon carbide powder with excellent sintering properties is disclosed by Prener in U.S. Pat. No. 3,085,863 entitled METHOD OF MAKING SILICON CARBIDE. The patent teaches a process of making pure silicon carbide which includes the steps of forming a silica gel in a sugar solution, dehydrating the gel to decompose the sugar and to form a finely divided mixture of silica and carbon, and heating the mixture.

The heavy nitrogen doping of SiC, even in the presence of boron, can be obtained by an addition of $Si_3N_4$ to the SiC powder prior to hot pressing. The doping is manifested by a green color of the pressing and by high electrical conductivity. Conductivities down to 0.5 reciprocal ohms are obtained with $Si_3N_4$ additions as shown in the following Table I which lists values measured at room temperature on 1" diameter discs hot pressed at 1950°C with varying amounts of $Si_3N_4$ added to submicron SiC powder.

instead of $\alpha$-(6H), namely, the $\alpha$-(4H)SiC. An intermediate situation was observed with 1% $Si_3N_4$ where all three polytypes were detected in the pressing.

Silicon nitride was not detected by X-ray analysis as a separate phase in the specimens having up to 5% $Si_3N_4$ addition, indicating that at this level of nitrogen and under the hot pressing condition, all the nitrogen is accommodated in the SiC lattice and the product does not contain free $Si_3N_4$.

It is known that the transformation to $\alpha$-(6H)SiC on hot pressing of SiC with boron addition brings about the tendency of exaggerated growth of large tabular grains and degradation of strength of such materials unless the growth is controlled. In the presence of nitrogen the formation of the $\alpha$-(6H)-SiC does not occur and hence the exaggerated grain growth is suppressed by the addition of silicon nitride. This results in fine grained microstructures and improvements in strength. Thus, for instance, a submicron SiC powder with a 1% boron addition when hot pressed at 2000°C showed on metallographic examination a fine grained matrix composed of $\beta$ SiC crystallites about 3 $\mu$ with tabular $\alpha$-(6H)-SiC grains up to several hundred microns long. The average strength of this material tested in three point bending was only 38,000 psi. When an addition of 5% $Si_3N_4$ was made to the same pressing powder the density on hot pressing at the same temperature was slightly lowered to about 3.17 g/cc and at the same time the large tabular grains completely disappeared. The microstructure was composed of uniform equiaxed grains with an average size of 2.5 microns and largest grains about 6 microns. The three point bending strength increased to 100,000 psi.

The $Si_3N_4$ addition is most conveniently introduced by mixing the powders of SiC and $Si_3N_4$ in an amount of

TABLE I

| %B weight | %B mole | %$Si_3N_4$ | N% mole | Room temp. resistivity-silicon | Phase Detected by x-rays |
|---|---|---|---|---|---|
| 1 | 1.9 | 0 | 0 | $5 \times 10^4$ | SiC-6H, $\beta$-SiC |
| 1 | 1.9 | 1 | 0.57 | $2 \times 10^4$ | SiC-6H, SiC-4H, $\beta$-SiC |
| 1 | 1.9 | 2 | 1.14 | $1.5 \times 10^3$ | SiC-6H, $\beta$-SiC |
| 1 | 1.9 | 4 | 2.85 | $1.5 \times 10$ | not performed |
| 1 | 1.9 | 5 | 3.58 | 2.0 | SiC - 4H, $\beta$-SiC |
| 1 | 1.9 | 10 | 7.12 | 3.0 | SiC - 4H, $\beta$-SiC $\alpha+\beta$ $Si_3N_4$, Si |

Table I lists results obtained in a series of hot pressed materials prepared with varying addition of $Si_3N_4$. The X-ray phase analysis performed on the hot pressed bodies shows that up to a 5 wt % of $Si_3N_4$ addition, no silicon nitride is detected in the product. A 10% addition, corresponding to 7.12 mol % of nitrogen resulted in detectable lines of two silicon nitride phases in addition to SiC and Si.

The nitrogen content was determined in some specimens by vacuum fusion analysis and found to closely correspond to that expected, so that, essentially no nitrogen is lost on hot pressing. Table I clearly shows that the N/B mole ratio has to exceed one in order to obtain appreciable conductivity. It also indicates that there is a change in the lattice structure of SiC due to the introduction of silicon nitride. In absence of $Si_3N_4$ the initial cubic $\beta$-SiC powder tends to transform into the $\alpha$-(6H) polytype of SiC. However, this transformation is usually not completed in 30 minutes during the hot pressing cycle, so that, the $\beta$ cubic SiC is found next to the newly formed $\alpha$-(6H)SiC. As indicated, the addition of $Si_3N_4$ causes another polytype of SiC to appear 3.5–10.0% by weight and ball milling. Also jet-milling preceded by premixing the powders in an effective technique. In ball milling, the wear of the balls may introduce contaminations harmful to some properties and therefore the milling time and the proper selection of charge to ball ratio is important. For instance, on using alumina balls and the charge to ball ratio one to three, wear amounting 0.50% alumina per charge was introduced after 4 hours milling time and 1.15% after 8 hours of wet grinding.

Jet milling eliminates the problem of wear entirely and is therefore a better approach to the mixing of the powders. Other techniques of mixing which do not have a simultaneous grinding action can be applied to the product mixture which are subjected to preliminary grinding.

There are several critical parameters during hot pressing which control the densification and microstructure of the final product. The most important of these are pressure, temperature, and time at the temperature. While they will be discussed individually, it is readily apparent that these conditions are interdependent.

The pressure range useful for full densification is between about 5,000 to 10,000 psi. For general uses and for larger articles, the pressure is limited by available die materials and design. Thus for solid graphite dies the upper limit is about 5,000 psi and for graphite fiber-wound dies the upper limit is about 10,000 psi. It is advantageous to use a pressure close to the upper limit of 10,000 psi because the application of high pressure makes it possible to keep the temperature low enough to control the grain growth. Low pressures below 5,000 psi, require the use of higher sintering temperatures or longer pressing time and generally yield lower end point densities. The first indication of densification on heating up is obtained at or slightly above 1600°C which may be detected by the motion of the press ram. However, for all practical purposes the required high density, above 98% of the theoretical, cannot be obtained below 1950°C.

The addition of $Si_3N_4$ to boron doped SiC powders retards densification somewhat so that increased temperatures of 50° to 100°C higher are required as compared to similar powders without the addition of $Si_3N_4$. At the same time however the tendency of the SiC grains to undergo exaggerated growth is suppressed, and increased temperature or extended time of the pressing cycle brings about only a slow and uniform coarsening of the microstructure which gives excellent control over the grain size. For instance, on pressing a 2 inch diameter disc ½ inch thick for 30 min. at 10,000 psi, a density of 98% of the theoretical was attained at 1950°C and 99% at 2000°C. A 60 min. hold under these conditions brought only marginal improvements in density. In either case, metallographic examination revealed uniform equiaxed grain structures with an average grain size of 2.2 and 2.9 microns, respectively.

With increasing size of the specimen, the time becomes an important parameter. For a 2 × ½ inch disc the finite density of 99% was obtained in 30 minutes at 2000°C and 10,000 psi. On pressing a 3 × 1 inch disc at the same conditions the density was 97.6%; however, an extended hold at the high temperature for 60 minutes increased the density to 98.9%, i.e. to essentially the same value as was obtained in the small specimen. Metallographic sections prepared from the central parts of the discs showed identical grain size.

During hot pressing an atmosphere must be used which is inert to silicon carbide under hot pressing conditions of temperature and pressure. Thus, oxidizing atmospheres such as air cannot be used since they would tend to oxidize the silicon carbide to silica, interfere with sintering and degrade the high temperature properties. Useful inert atmospheres as defined herein include argon, helium and nitrogen.

My invention is further illustrated by the following examples.

Example I

Amorphous boron (99.0% pure) and silicon nitride (99.8% pure) powders having a particle size of $-2\ \mu$ were separately prepared by jet milling. A dry powder mixture was prepared by combining 120 g. of submicron sized $\beta$-SiC powder, 1.2 g. of boron powder, and 6 g. of silicon nitride powder. The powder mixture was then added to 150 ml of a 0.5% aluminum stearate solution in benzene. The slurry was then tumbled in a plastic jar with alumina balls for a period of five hours. Thereafter, the slurry was dried and the resulting powder was screened through a 40 mesh sieve.

The powder mixture was then charged in a one-inch bore graphite die and hot pressed at a temperature of 1950°C and a pressure of 10,000 psi for 30 minutes. The pressing had a density of 3.178 g/cc, equivalent to 98.9% of the theoretical density. Further, evaluation of the product showed the following properties:

TABLE II

| Phase Composition by x-ray analysis: ($\alpha$ - (4H)-SiC | ($\beta$ - SiC |
|---|---|
| Grain size | 1.5 $\mu$ |
| Electrical conductivity | 0.5 recip ohm-cm. |
| Creep rate, strain in bending at 1550°C and 30,000 psi | $3.5 \times 10^{-8}$/sec. |
| Flexural strength, 25°C | $1.03 \times 10^5$ psi. |

Example II

A $\beta$-silicon carbide powder was prepared by pyrolysis of methyltrichlorosilane and doped with 1 weight percent of boron. The powder was then mixed with 5 weight percent of silicon nitride powder to form a homogeneous powder dispersion.

The powders were dispersed in benzene to form a thin slurry and stirred for 2 minutes in a liquid blender. After drying, the powder mixture was jet milled and 15 g. of the powder was charged into a one-inch graphite die and hot pressed at a temperature of 2000°C and a pressure of 10K psi for a period of 30 minutes.

The faces of the specimen in the form of a short cylinder were ground off and silver plated. The resistance of the sample at 6 volts was found to be 3 ohms.

Example III

The faces of a ⅜ inch thick disc were coated by silver paint to suppress transient resistance between the workpiece and the grips of the EDM apparatus. The workpiece was clamped in the vise, which is connected to the current source, and immersed in the electrolyte. The tool was a ¼ inch square brass rod clamped in the chuck and connected to the other electrode. The tool was made the positive electrode though the reversed polarity could also be applied with no apparent effect on tool wear. After the arcing was commenced, the voltage was adjusted to 40V and maintained for the entire machining operation. Under these conditions it took 13 minutes to drill a rectangular hole through the workpiece. The removal rate is of course dependent on the voltage-current conditions and may be adjusted in a wide range. Inspection of the surface of the workpiece indicated no damage such as thermal shock cracks.

It will be appreciated that the invention is not limited to the specific details shown in the examples and illustrations and that various modifications may be made within the ordinary skill in the art without departing from the spirit and scope of the invention.

I claim:

1. A method of making a dense silicon carbide ceramic comprising the steps of
    a. forming a substantially homogeneous dispersion of a submicron powder of silicon carbide, a boron containing compound selected from the group consisting of boron and boron carbide, wherein the amount of the boron containing compound is equivalent to 0.3–3.0% by weight of boron, and 3.5–10.0% by weight of silicon nitride, and b. hot pressing the dispersion in an inert atmosphere at a temperature of about 1950°–2050°C and at a pressure of about 5,000–10,000 psi for a sufficient time to produce a high density ceramic.

2. The method of claim 1, wherein said time is about 10–60 minutes.

3. The method of claim 2, wherein said compound is boron.

4. The method of claim 2, wherein said compound is boron carbide.

5. The method of claim 3, wherein the inert atmosphere is argon, the temperature is about 1950°C, the pressure is about 10,000 psi and the time is about 30 minutes.

* * * * *